UNITED STATES PATENT OFFICE.

LAWSON B. WILSON, OF WASHINGTON, DISTRICT OF COLUMBIA.

NON-CONDUCTING PLASTIC COMPOSITION OR CEMENT KNOWN AS PLASTIC ENAMEL.

1,389,084. Specification of Letters Patent. Patented Aug. 30, 1921.

No Drawing. Application filed May 7, 1920. Serial No. 379,548.

*To all whom it may concern:*

Be it known that I, LAWSON B. WILSON, a citizen of the United States, residing at 1203 F street northwest, in the city of Washington, in the District of Columbia, have invented a new and useful Non-Conducting Plastic Composition or Cement Known as Plastic Enamel, of which the following is a specification.

This application is a continuation in part of my application Serial Number 354,232, filed January 20, 1920.

The object of my invention is the production of a plastic non-conducting composition or cement known as plastic enamel to be applied to the surfaces of broken objects requiring repair or mending, and for use as an adhesive agent to mend or repair such useful articles as ornaments, dishes, glassware, furniture, wood-work, metals, false-teeth, shoes, rubbers, leaks in gas and water pipes, clothing, shirts, canvas fabrics, auto-tops and seats, build up worn threads, leaks in boats, stiffen, repair and make waterproof, canvas for use on airplanes, etc.

My composition contemplates the use of a preferably gelatinized cellulose ester or other derivative, a solvent therefor, and a phenol. As examples of the cellulose ester or other derivative I find that any ester such as the nitrate or acetate, butyrate etc., or an ether such as the ethyl ether and others as found in Lilenfeld U. S. Patent 1188376 may be used. It is to be understood that cellulose acetate and the cellulose ethers are considered to be equivalents of the nitrocellulose specified in the claims.

As solvents I may use any of the various well known solvents in this art, examples of which are acetone, alcohols, amyl acetate, fusel oil, anilin, nitrobenzol, acetic acid, various essential oils, etc., these solvents being used singly or in combination as phenols.

As phenols, I find phenol, the various cresols, naphthols, etc. to have utility in this connection.

In one exemplification of my composition I find that celluloid, acetone and phenol give a very valuable composition for general purposes. These components may be used in the following proportions:—

Celluloid _____ 4 parts
Acetone _____ 5 parts
Phenol _____ 3 parts in volume.

I find that these proportions are well calculated to give an excellent cementing material for general use. This example is given merely to comply with the statutory requirements, whence it is to be understood that my invention in its broad aspects is not in any way limited thereby.

To secure special properties of advantage under particular circumstances I have found that softening agents, fillers, and pigments may be used.

As softening and plasticizing agents the following are found desirable: camphor, castor oil, naphthalene and its derivatives such as the chlorids, organic esters such as ethyl acetate, inorganic esters such as triphenyl phosphate, molasses, etc.

As fillers, shellac, gums and resins of various kinds, balsam, etc. or inorganic fillers such as heavy spar, calcium carbonate etc. may be used.

For the purpose of coloring the material as desired any dye or pigment, organic or inorganic may be used.

For the purpose of fixing leaks in boats, and holes in shoes or filling up depressions, etc., the composition comprising nitrocellulose, a phenol and a solvent, is poured into a bottle containing pellets of cotton of the size ranging from a one cent piece to a twenty-five cent piece. When this is done the cotton thereby becomes completely saturated with the plastic enamel and may be applied to repair a leaky boat by placing the saturated cotton tightly between the cracks and permitting it to set until hard. In order to make it more secure and permanent it is advisable to pour plastic enamel over the cotton. Good results are obtained by applying small quantities at a time, applying subsequent coats or layers after the first coat has hardened. The same method is pursued in fixing holes in shoes.

This composition of ingredients containing the aforementioned chemicals may be made in different colors by adding pigments such as aluminum, gold, carmine, lampblack, oxid of zinc, etc. By adding pigments, the viscosity of the composition is increased.

My composition is light when set; is a very efficient non-conductor of heat and cold; is impervious to water, hot or cold; adheres to any dry surface, and as a whole possesses to a high degree properties which makes a useful cement for use in households, machine shops, dental offices, and for other useful commercial purposes. My composition is useful for the making of bridge work, plates, partial plates, plumpers, tightening old sets of teeth, mending cracked plates, and adding teeth to broken sets.

Attempts have been made to produce cementing compositions previously, but they have all fallen short of the admirable materials produced by me because of one of two reasons: first, because they do not use phenols, or second, because they have failed to use a gelatinized cellulose derivative. The first compositions, of course, fall short of that used by the applicant. The second appears to have failed because there was no realization of the valuable properties of a gelatinized cellulose derivative. In such form, the gelatinized cellulose is much more susceptible to chemical action, and I believe that in this form, when treated with such materials as acetone and phenol, there is a relatively slow tendency to form condensation products. However, whatever the action may be, I find that by my composition I have been able to secure unique properties not before known in this art. Obviously by varying the proportions of the materials the viscosity of the mixture can be controlled.

I claim:

1. A nitrocellulose composition containing celluloid, four parts; acetone, five parts; phenol, three parts, all by volume.

2. A cementing composition comprising the following:—

Nitrocellulose _____ 4 parts
Acetone _____ 5 parts
Phenol _____ 3 parts all by volume.

L. B. WILSON.